United States Patent Office 2,813,007
Patented Nov. 12, 1957

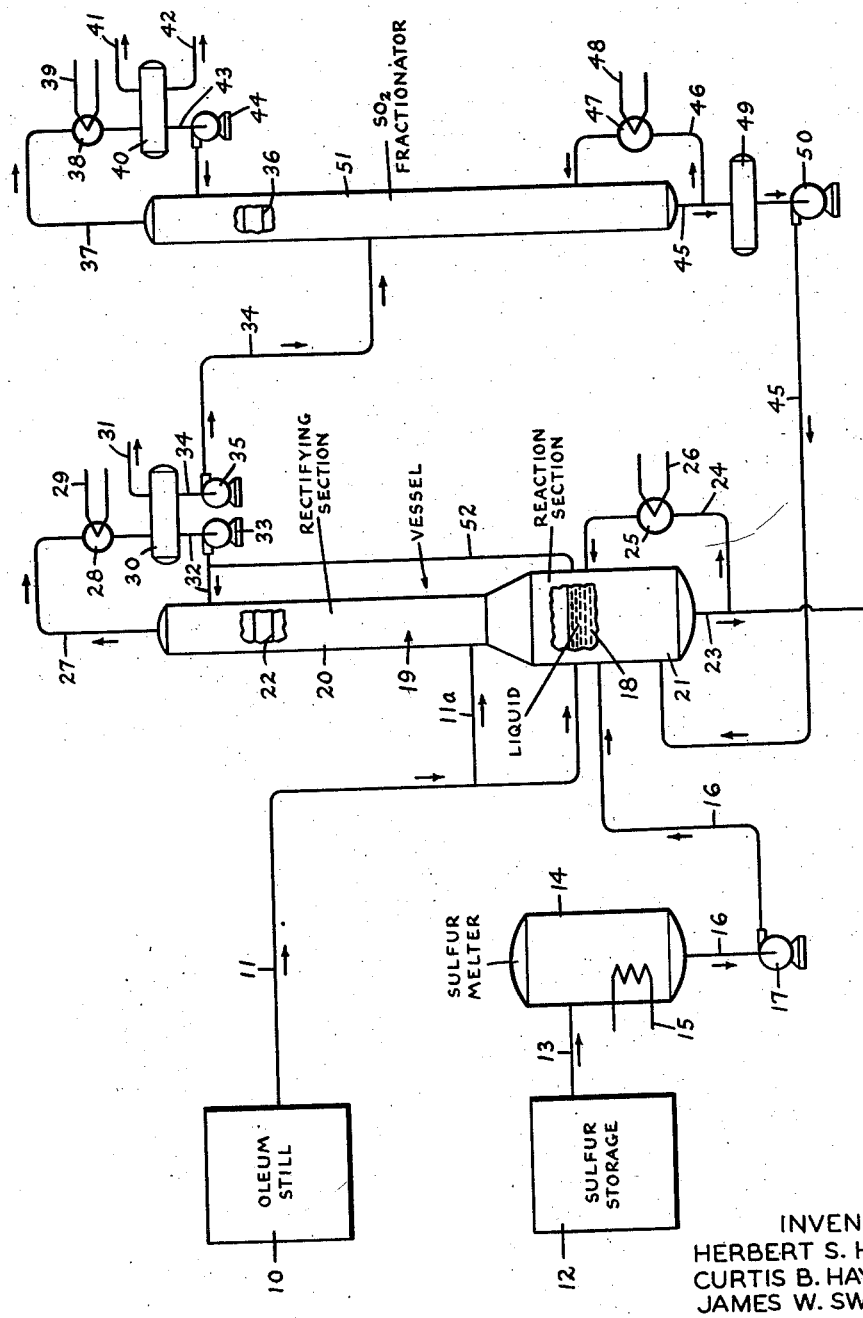
Nov. 12, 1957   H. S. HALL ET AL   2,813,007
MANUFACTURE OF SULFUR DIOXIDE FROM SULFUR
AND SULFUR TRIOXIDE
Filed Aug. 12, 1953
INVENTORS.
HERBERT S. HALL
CURTIS B. HAYWORTH
JAMES W. SWAINE
BY
ATTORNEY.

2,813,007

MANUFACTURE OF SULFUR DIOXIDE FROM SULFUR AND SULFUR TRIOXIDE

Herbert S. Hall, Pennsauken Township, Camden County, N. J., and Curtis B. Hayworth, Forest Hills, and James W. Swaine, Manhasset, N. Y., assignors to Allied Chemical & Dye Corporation, New York, N. Y., a corporation of New York Application August 12, 1953, Serial No. 373,786

7 Claims. (Cl. 23—177)

This invention relates to a method of production of sulfur dioxide. It is particularly directed to a method of production of pure, anhydrous, liquid sulfur dioxide.

Prior to this invention processes have been proposed to make sulfur dioxide in concentrated form by reaction between sulfur and sulfur trioxide or fuming sulfuric acid. Effluent sulfur dioxide-containing gases from these processes contain substantial amounts of other materials, which it has been customary to remove by washing and absorption techniques using aqueous media such as sulfuric acid. These techniques are undesirable in that they produce acid mist and otherwise introduce water vapor into the system, thus necessitating further treatment for removal of these materials to avoid resulting corrosion problems. The absorption processes including regenerating or other treatment of the absorbent represent items of investment and/or operating expense.

It has now been discovered that sulfur dioxide can be produced in pure anhydrous form by integrated reaction and purification steps under correlated interdependent conditions of operation without resort to absorption techniques or introduction into the system of any extraneous material. One object of this invention is to produce pure, concentrated, anhydrous sulfur dioxide, readily capable of being purified. A second object of this invention is to continuously produce anhydrous sulfur dioxide in a process characterized by the absence of compressors and other refrigeration equipment. Other objects of this invention will be apparent to those skilled-in-the-art from inspection of the following description.

This invention comprises reacting sulfur and sulfur trioxide in the presence of an excess of the latter at temperature above its boiling point, preferably at molten or near-molten sulfur temperatures, under conditions of pressure which maintain at least a portion of the excess sulfur trioxide in liquid phase as a reaction medium and which permit escape of product sulfur dioxide as a gas. That product is subjected directly to fractionation under reflux conditions at a pressure which preferably is substantially that maintained during the reaction, e. g. the autogenous pressure of released sulfur dioxide-containing gas. By preference, the reaction conditions including pressure are such that the reaction medium contains a substantial quantity of liquid phase sulfur dioxide, e. g. 10%–90% by weight of the reaction medium.

Furthermore, according to a preferred mode of practice of the invention, the reaction and distillation zones are in juxtaposed, intercommunicating relation, and sulfur dioxide reflux is established in the fractionating zone at sufficiently high rate to maintain the reaction medium at desired concentration of sulfur dioxide e. g. in the preferred range of 10%–90% by weight of reaction medium.

This invention may be described in connection with the attached drawing which is a diagrammatic flow sheet of one embodiment of this invention.

According to preferred practice as shown in the drawing, sulfur trioxide may be prepared in oleum still 10 and withdrawn therefrom through line 11 preferably after cooling to liquid form. Sulfur trioxide may alternatively be received at the installation in liquid form and used as such, in which event there may be present therein small amounts of stabilizing compound such as a boron-containing compound, which serves to prevent polymerization of the liquid form to the solid form as disclosed e. g. in U. S. Patent 2,458,718. In either event liquid sulfur trioxide is passed through line 11 to a suitable reaction zone for example the reaction section 21 of vessel or reactor 19. For convenience in handling in the preferred continuous operation sulfur as admitted to reaction section 21 is preferably in liquid form. To this end sulfur charge is withdrawn from sulfur storage 12 and passed to sulfur melter 14 through line 13. Heat may be supplied thereto as by steam coil 15, and liquid sulfur is passed to reaction section 21 through line 16 by pump 17.

In reaction section 21 of vessel 19, there is maintained a body of reaction medium 18, in anhydrous liquid state under the conditions of operation. This reaction medium contains anhydrous liquid oxides of sulfur including primarily sulfur dioxide and sulfur trioxide; although other oxides of sulfur such as sulfur monoxide, SO, sulfur sesquioxide, $S_2O_3$, and/or sulfur heptoxide, $S_2O_7$, may also be present to some extent under the conditions of operation, the reaction medium may be formed from and will be referred to as containing only sulfur dioxide and sulfur trioxide.

The reaction medium (excluding free sulfur present) may contain from substantially 10% to 100% sulfur trioxide, which together with sulfur dioxide makes up the total. Under preferred operating conditions, however, 10%–90% by weight is the preferred range of concentration of the sulfur dioxide. Concentration of sulfur dioxide in liquid 18 may be maintained at desired level by returning suitable quantities of condensed (and preferably fractionated) reaction product either directly to the reaction zone or after first passing through a suitable fractionating zone from which it is recoverable therefrom as liquid, for example as excess reflux flowing through and from rectifying section 20.

Operation in the liquid state in reaction section 21 is preferably insured by maintaining the temperature at molten or near-molten sulfur temperatures, preferably above 248° F., and by controlling pressure in the vapor phase immediately above the reaction mixture sufficient to maintain a liquid reaction medium which releases a vapor stream containing sulfur dioxide. Pressure in reaction section 21 is preferably maintained by control of autogenous pressure of the released sulfur dioxide containing gas at somewhat above the critical pressure of the desired reaction medium therein. That medium is simultaneously maintained below its critical temperature. The vapor effluent from the liquid body 18 is then subjected to rectification in the presence of reflux, preferably at that pressure except for inherent systemic pressure drop. Reaction temperature and reflux pressure are preferably such that internal or external condensation of rectified overhead to form net product and reflux, can be effected with cooling water ordinarily available for example, at temperatures in the range of 60° F.–100° F.

The temperature maintained within the reaction medium at a given pressure, will vary according to the particular composition of the liquid body 18, and will tend to be somewhat lower with increases in its content of sulfur dioxide. Preferably this temperature is controlled to be sufficiently high to adequately sustain the reaction between sulfur trioxide and sulfur, which proceeds at low temperature, and to effectively liberate sulfur dioxide product from the liquid body. It is to be understood that in practice this temperature may be any temperature below the critical temperature for the particular composition of liquid in body 18 under the other conditions of operation. Although the reaction may be maintained at near-molten sulfur temperatures, more advantageous operation is obtained at higher temperature. In practice it is preferred that such temperature be 5° F. to 70° F. above the melting point of the sulfur charge. However, in the event that cooling medium is available at temperatures somewhat lower than 60° F.–100° F., satisfactory operating temperatures in the reaction medium may be somewhat below the melting point of the sulfur charge, within the range indicated, with corresponding adjustment in pressure.

Typical pressure of operation may be 185 p. s. i. g. to 700 p. s. i. g. and corresponding temperatures within the reaction medium may be 260° F. to 320° F., for example 300 p. s. i. g. and 260° F. respectively when the reaction medium is composed substantially entirely of sulfur trioxide. Where the reaction medium is controlled to contain predominantly sulfur dioxide, e. g. 80%–90% of that component, typical pressure and temperature of reaction medium may be, for example, of the order of 700 p. s. i. g. and 260° F.

Reaction occurring in reaction section 21 of vessel 19 is as follows:

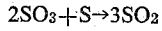

$$2SO_3 + S \rightarrow 3SO_2$$

In the liquid reaction medium it is necessary that the sulfur trioxide be present in excess over the free sulfur present, as for example to the extent of 10% to 100% over the stoichiometric ratio of sulfur trioxide: sulfur of 2:1. Effluent gas containing sulfur dioxide and small quantities of sulfur trioxide, is withdrawn from the reaction medium 18 and passed to rectifying section 20, preferably located immediately superjacent to and connected with reaction section 21. Temperature of the reaction in section 21 may be controlled by withdrawing at least a portion of the reaction medium through lines 23 and 24, passing it through heat exchanger 25, to be heated or cooled therein as required, and returning to section 21.

In order to prevent sulfur carry-over into the rectifying section 20 and its fouling by accumulated sulfur, it is preferred to maintain an excess of sulfur trioxide in the gas phase over the main body 18 of reaction medium. This may be done by flashing-off a portion of the incoming liquid sulfur trioxide introduced into the gas phase thereabove rather than introducing the entire feed thereof directly into the liquid phase as shown in the drawing, or by feeding the charge sulfur trioxide or a part thereof onto the lower deck of the rectifying section through which ascending sulfur-containing gases pass, as by line 11a.

The predominantly sulfur dioxide effluent gas from reaction section 21 is passed upwardly through rectifying section 20, desirably containing a plurality of decks 22, of reactor 19 countercurrent to reflux liquid. The net overhead gas in line 27, substantially entirely sulfur dioxide, ordinarily contains from 90% to 99+% of this substance and trace or small quantities of sulfur trioxide, say from less than 1% to 10% by weight of the total overhead. This gas is condensed in heat exchanger 28 which is cooled by cooling medium such as water in line 29, and collected in reflux drum 30. At least a portion thereof is returned to reactor 19 as reflux through line 32 by reflux pump 33, and the remainder is withdrawn through line 34 and pump 35 for ultimate use, or if desired, to be further fractionated as hereinafter described. Preferred reflux ratio of reflux:net product under the conditions of operation is 8 to 1 tending to be lower when the reaction medium 18 is substantially entirely sulfur trioxide, and higher when that medium contains a substantial proportion, say 50% or above, of sulfur dioxide product. Uncondensables may be withdrawn through line 31.

Overhead product in line 27 from rectifying section 20 when condensed and returned as reflux to the reactor 19 through line 32, serves to control the degree of fractionation in the rectifying section 20 and thus the purity of the net product in e. g. line 34. Determination and maintenance of desired sulfur dioxide concentration in liquid body 18 may also be effected by operating with sufficiently high reflux ratio so that substantial proportions of reflux sulfur dioxide flow entirely through rectifying section 20 and into reaction section 21. Thus rectifying section 20 may serve as a return conduit for this purpose in addition to fractionating the desired product. When operating in this manner, reflux ratio of reflux:net product usually may be 8 to 1 when the concentration of sulfur dioxide within liquid body 18 is of the order of 10% of the total oxides of sulfur present. At higher concentrations, say 80%–90% sulfur dioxide in liquid body 18, the reflux ratio may be higher. Operation with reflux to serve the dual purpose indicated, can result in direct production of sulfur dioxide of commercially acceptable high purity in line 34.

Although the return of sulfur dioxide to reaction section 21 to maintain desired concentration of this component within liquid body 18 has been described as being effected by operating rectifying section 20 at sufficiently high reflux ratios, at least a portion of the sulfur dioxide desired to be passed to reaction section 21 may alternatively be obtained from a source other than reflux. For example, a portion of the overhead from rectifying section 20, which may be substantially pure sulfur dioxide containing only traces of sulfur trioxide, could be withdrawn e. g. as from line 32 and passed through line 52 directly to reaction section 21. Alternatively if rectifying section overhead is further fractionated as hereinafter set forth, to produce a liquid sulfur dioxide product of greater purity, a portion of this product could be recycled to reaction section 21 to maintain concentration of sulfur dioxide therein. Furthermore anhydrous liquid sulfur dioxide, from any extraneous source, could also be admitted to reactor 20 in quantity sufficient to control the concentration of sulfur dioxide therein. If one of these alternatives is employed, the reflux ratio in rectifying section 20 may be decreased proportionately, i. e. it may be maintained at a value adequate to control only fractionation in rectifying section 20 without regard to return of sulfur dioxide to reaction section 21. It may be desirable to effect fractionation of the sulfur dioxide-sulfur trioxide mixture leaving liquid 18 in two or more stages, in which event the rectifying section 20 will be operated primarily to maintain the desired composition of liquid 18. Then a second fractionating step, usually in a fractionator of lesser capacity, will serve to remove small quantities to traces of sulfur trioxide remaining in the sulfur dioxide overhead from the rectifying section. In order to effect this, liquid in line 34 may be passed to sulfur dioxide fractionator 51, containing decks 36 wherein it is fractionated. Sulfur dioxide of substantially 100% purity may be withdrawn as overhead through line 37, condensed in condenser 38, preferably with cooling water from line 39. From accumulator 40, reflux is returned to tower 51 through line 43 by pump 44, and net product is removed through line 42. Uncondensables are withdrawn through line 41.

Fractionator bottoms may be removed through line 45, reboiled in reboiler 47 heated by heating medium from line 48, and returned to the tower 51. Net bottoms, collected in accumulator 49, contain substantially all the sulfur trioxide from line 34.

Depending on conditions of operation, pump 50 may continuously or batchwise recycle liquid from accumulator 49 through line 45 to reaction section 21 of reactor 19. Draw-off 23 may be provided from reactor 19 to prevent build-up of undesirable polymers, water, sulfuric acid, etc.

Whereas the reaction has been particularly described in connection with a particular method of operation of one embodiment thereof, it is apparent to those skilled

We claim:

1. The process of producing sulfur dioxide by reaction of sulfur with sulfur trioxide in the presence of an excess of the latter which comprises maintaining within a pressurized reaction zone a liquid body of reaction medium consisting essentially of sulfur and sulfur oxides, said sulfur oxides comprising about 10% to about 90% by weight sulfur dioxide and the balance sulfur trioxide, admitting sulfur and sulfur trioxide into said zone, maintaining said body at temperature at least approximately that of the melting point of sulfur but below the critical temperature of said body to effect reaction between said sulfur and sulfur trioxide, thereby producing a sulfur dioxide-containing effluent gas, maintaining said body under pressure of said effluent gas at about the critical pressure of said body to maintain the same in liquid phase, and withdrawing sulfur dioxide-containing effluent gas from said zone.

2. The process according to claim 1 wherein the liquid reaction medium is maintained at temperature of 260° F. to 320° F.

3. The process according to claim 1 wherein a portion of the sulfur trioxide admitted to the reaction zone is introduced in vapor phase above the liquid body of reaction medium, whereby the sulfur dioxide-containing effluent gas is rendered substantially free of unreacted and entrained sulfur.

4. The process according to claim 1 wherein maintenance of the desired concentration of sulfur dioxide in the reaction medium is assisted by the introduction thereto of liquid sulfur dioxide.

5. The process of producing sulfur dioxide by reaction of sulfur and sulfur trioxide in the presence of an excess of the latter which comprises maintaining within a pressurized reaction zone a liquid body of reaction medium consisting essentially of sulfur and sulfur oxides, said sulfur oxides comprising about 10% to about 90% by weight sulfur dioxide and the balance sulfur trioxide, admitting sulfur and sulfur trioxide into said zone, maintaining said body at temperature at least approximately that of the melting point of sulfur but below the critical temperature of said body to effect reaction between said sulfur and sulfur trioxide, thereby producing a sulfur dioxide-containing effluent gas, maintaining said body under pressure of said effluent gas at about the critical pressure of said body to maintain the same in liquid form, fractionating said effluent gas under reflux of sulfur dioxide to recover purified sulfur dioxide as distillate, returning a portion of the sulfur dioxide distillate to said body to assist in maintaining the desired concentration of sulfur dioxide therein, and recovering the balance of the sulfur dioxide distillate as product of the operation.

6. The process of producing sulfur dioxide by reaction of sulfur with sulfur trioxide in the presence of an excess of the latter which comprises maintaining within a pressurized reaction zone a liquid body of reaction medium consisting essentially of sulfur and sulfur oxides, said sulfur oxides comprising about 10% to about 90% by weight sulfur dioxide and the balance sulfur trioxide, admitting sulfur and sulfur trioxide into said zone, maintaining said body at temperature at least approximately that of the melting point of sulfur but below the critical temperature of said body to effect reaction between said sulfur and sulfur trioxide, thereby producing a sulfur dioxide-containing effluent gas, maintaining said body under pressure of said effluent gas at about the critical pressure of said body to maintain the same in liquid phase, fractionating said effluent gas under reflux of sulfur dioxide and under substantially reaction pressure to yield product sulfur dioxide, and returning a portion of the reflux employed in said fractionation to said body to assist in maintaining the desired concentration of sulfur dioxide therein.

7. The process of producing sulfur dioxide by reaction of sulfur with sulfur trioxide in the presence of an excess of the latter which comprises maintaining within a pressurized reaction zone a liquid body of reaction medium consisting essentially of sulfur and sulfur oxides, said sulfur oxides comprising about 10% to about 90% by weight sulfur trioxide and the balance sulfur dioxide, admitting sulfur and sulfur trioxide into said zone, maintaining said body at temperature of 260° F. to 320° F. to effect reaction between said sulfur and sulfur trioxide, thereby producing a sulfur dioxide-containing effluent gas, maintaining said body under pressure of said effluent gas within the range of 185 to 700 p. s. i. g. to maintain the same in liquid phase, fractionating said effluent gas under reflux of sulfur dioxide and under substantially reaction pressure to yield product sulfur dioxide, and returning a portion of the reflux employed in said fractionation to said body to assist in maintaining the desired concentration of sulfur dioxide therein.

References Cited in the file of this patent

UNITED STATES PATENTS

| | | |
|---|---|---|
| 1,896,483 | Dohse | Feb. 7, 1933 |
| 2,156,791 | Mohr | May 2, 1939 |
| 2,381,876 | Carlson | Aug. 14, 1945 |
| 2,726,933 | Merriam et al. | Dec. 13, 1955 |

FOREIGN PATENTS

| | | |
|---|---|---|
| 627,848 | Great Britain | July 24, 1946 |

OTHER REFERENCES

Perry: "Chemical Engineers Handbook," third edition, McGraw-Hill Book Co., 1950, page 275.